United States Patent
Dong-Hi et al.

(10) Patent No.: US 8,451,922 B2
(45) Date of Patent: May 28, 2013

(54) SIGNAL PROCESSING METHOD IN MIMO SYSTEM AND APPARATUS THEREOF

(75) Inventors: Sim Dong-Hi, Seoul (KR); Seo Dong-Youn, Seoul (KR); Kim Bong-Hoe, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1027 days.

(21) Appl. No.: 12/050,906

(22) Filed: Mar. 18, 2008

(65) Prior Publication Data

US 2008/0307295 A1    Dec. 11, 2008

Related U.S. Application Data

(63) Continuation of application No. 10/724,514, filed on Nov. 26, 2003, now Pat. No. 8,040,993.

(30) Foreign Application Priority Data

Nov. 27, 2002    (KR) .......................... 10-2002-074226

(51) Int. Cl.
*H04B 7/02*    (2006.01)
*H04L 1/02*    (2006.01)

(52) U.S. Cl.
USPC ............ 375/267; 375/330; 375/367; 375/130

(58) Field of Classification Search
USPC ...... 375/367, 240.24, 267, 130, 136; 714/807
See application file for complete search history.

(56) References Cited

U.S. PATENT DOCUMENTS 5,507,035 A    4/1996    Bantz et al.
5,598,427 A    1/1997    Arthur et al.
(Continued)

FOREIGN PATENT DOCUMENTS

CN    1353510    6/2002
EP    0735701 A2    10/1996
(Continued)

OTHER PUBLICATIONS

Wolniansky, P.W.; Foschini, G.J.; Golden, G.D.; Valenzuela, R.A.; "V-BLAST; An Architecture for Realizing Very High Data Rates Over the Rich-Scattering Wireless Channel", IEEE, Oct. 1998 pp. 295-300.

(Continued)

*Primary Examiner* — Daniel Washburn
*Assistant Examiner* — Qutbuddin Ghulamali
(74) *Attorney, Agent, or Firm* — Lee, Hong, Degerman, Kang & Waimey

(57)    ABSTRACT

Disclosed is a signal processing method and apparatus in MIMO system. In a mobile communication system having a plurality of transmitting antennas, the present invention includes the steps of receiving a feedback signal including status information of at least one channel, segmenting one of the first data blocks to segment into at least one or more of the second data blocks, attaching a CRC to each of the at least one or more of the second data blocks, allocating the at least one or more second data blocks to a plurality of the transmitting antennas, respectively, and transmitting the at least one or more of the second data blocks. In a mobile communication system having a plurality of receiving antennas, the present invention includes the steps of receiving at least one data block including a CRC or dummy bits, acquiring channel status information using the CRC or dummy bits, and transmitting the channel status information.

16 Claims, 3 Drawing Sheets

U.S. PATENT DOCUMENTS

| | | | |
|---|---|---|---|
| 5,822,359 A | 10/1998 | Bruckert et al. | |
| 6,480,475 B1 | 11/2002 | Modlin et al. | |
| 6,754,473 B1* | 6/2004 | Choi et al. | 455/101 |
| 6,774,864 B2 | 8/2004 | Evans et al. | |
| 6,901,551 B1* | 5/2005 | Corrigan, III | 714/763 |
| 6,922,445 B1* | 7/2005 | Sampath et al. | 375/267 |
| 6,961,388 B2 | 11/2005 | Ling et al. | |
| 7,295,624 B2* | 11/2007 | Onggosanusi et al. | 375/267 |
| 2002/0004924 A1* | 1/2002 | Kim et al. | 714/752 |
| 2003/0014709 A1 | 1/2003 | Miyoshi et al. | |
| 2003/0060173 A1* | 3/2003 | Lee et al. | 455/103 |
| 2004/0190551 A1 | 9/2004 | Matsumoto et al. | |
| 2006/0007895 A1 | 1/2006 | Coralli et al. | |
| 2006/0209765 A1* | 9/2006 | Li et al. | 370/334 |

FOREIGN PATENT DOCUMENTS

| | | |
|---|---|---|
| KR | 1999-0044194 | 6/1999 |
| WO | WO 02-45293 A2 | 6/2002 |
| WO | WO 02-082689 A2 | 10/2002 |
| WO | WO 02-091657 A1 | 11/2002 |
| WO | WO 02/091657 A1 | 11/2002 |

OTHER PUBLICATIONS

Heath Jr. R.W. et al: "Antenna Selection for Spatial Multiplexing Systems Based on Minimum Error Rate", IEEE International Conference, 2001, p. 2276-2280, vol. 7.

* cited by examiner

SIGNAL PROCESSING METHOD IN MIMO SYSTEM AND APPARATUS THEREOF

This application is a continuation of U.S. application Ser. No. 10/724,514, filed Nov. 26, 2003, now U.S. Pat. No. 8,040,993, which pursuant to 35 U.S.C. §119(a), claims the benefit of earlier filing date and right of priority to Korean Application No. 10-2002-0074226, filed on Nov. 27, 2002, the content of which is hereby incorporated by reference herein in its entirety.

BACKGROUND OF THE INVENTION

1. Field of the Invention

The present invention relates to a signal processing method applied to a mobile communication system, and more particularly, to a method of segmenting to transfer a data block in MIMO (multi-input-multi-output) system and apparatus thereof.

2. Discussion of the Related Art

Generally, in mobile communication, it is known that MIMO (multi-input-multi-output) system is superior to a conventional unit-antenna system. Namely, in case of a rich scattering environment, the MIMO system shows the better performance than that of uni-to-uni antenna or uni-to-multi antennas.

In order for the MIMO system to operate more efficiently, there should be less correlation between signals received by a plurality of receiving antennas. One example of MIMO mobile communication system according to a related art is explained as follows.

FIG. 1 is a block diagram of V-BLAST (vertical Bell laboratories layered space time) system as one of MIMO systems.

Referring to FIG. 1, V-BLAST as a kind of MIMO system has M transmitting antennas 12 and N receiving antennas 16. The V-BLAST system enables to have M*N independent channels according to the number of antennas, thereby having a performance superior to that of a conventional uni-antenna system. A transmitting end of V-BLAST system separately transmits transmission data generated in sequence through M transmitting antennas.

Namely, the data 11 to be transferred pass a vector encoder 10. Signals inputted serially pass the vector encoder 10 to be converted to parallel signals. The serial-to-parallel converted signals are transmitted through M transmitting antennas. Generally, in order to enable parallel transmissions through the respective antennas, the MIMO system is designed to have the number of the receiving antennas 16 be greater than that of the transmitting antennas 12 (M<N).

The transmitting end individually transmits signals via the M antennas, and a receiving end individually receives the signals via the N antennas. Hence, the receiving antennas respectively receive the signals transmitted through the M transmitting antennas, and perform a predetermined algorithm on the received signals to detect the signals transmitted from the respective transmitting antennas. A signal processing unit 18 of the V-BLAST receiving end, as shown in FIG. 1, is for detecting signals, which were separately transmitted from the M antennas, from the receiving end.

The transmitting end of the V-BLAST system does not use a separate signal processing or space-time code. Namely, input signals are simply transmitted via the M antennas, respectively. And, the V-BLAST receiving end receives the signals, which were transmitted via the M transmitting antennas, through the N antennas, and detects the signals transmitted from the respective transmitting antennas using an appropriate signal processing algorithm.

A signal processing procedure in the receiving end is explained as follows. In detecting a signal transmitted via a specific transmitting antenna, signals transmitted from other transmitting antennas are handled as interference signals. Namely, the receiving end uses a method of computing weight vector of a receiving array antenna for each of the signals transmitted via the respective transmitting antennas and removing the influence of the previously detected signal. Meanwhile, the receiving end may use a method of detecting signals transmitted from the respective transmitting antennas in greater order of signal to interference noise ratio.

If the signals independently transmitted from the respective transmitting antennas enable to maintain their independency while passing a mobile communication channel 14, such a signal processing method is very efficient. Yet, there substantially exists a prescribed amount of correlation in a transmitting antenna array as well as a prescribed amount of correlation exists between the receiving antennas of a receiving antenna array. Hence, it is probable that independent channels as many as the product number (M*N) between the respective transmitting antennas and the respective receiving antennas may fail to be maintained.

In the MIMO system, the communication can be performed most efficiently in case that the receiving end receives the independently transmitted signals via the transmitting antennas to handle independently. Yet, if the independency of the respective channels is not guaranteed, it is difficult for the receiving end to separately detect the signal of the specific transmitting antenna. Hence, the specifically transmitted signal frequently causes errors to the receiving end.

As explained in the foregoing description, in case that the channel independency is broken as the input signals are simply transmitted via the respective antennas without using the separate signal processing or space-time code, the related art signal processing method in the MIMO system is unable to actively cope with such a variation.

SUMMARY OF THE INVENTION

Accordingly, the present invention is directed to a method of segmenting to transfer a data block in MIMO (multi-input-multi-output) system and apparatus thereof that substantially obviates one or more problems due to limitations and disadvantages of the related art.

An object of the present invention is to provide an apparatus and method of segmenting to transfer data blocks in MIMO (multi-input-multi-output) system having a plurality of transmitting and receiving antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a signal processing apparatus according to the present invention includes a feedback signal reception unit receiving status information of at least one channel, a data block segmentation unit receiving one of the first data blocks to segment into at least one or more of the second data blocks, a CRC attachment unit attaching a CRC to each of the at one or more of the second data blocks, a data block allocation unit allocating the at least one or more of the second blocks according to an antenna via which the at least one or more of the second data blocks will be transmitted, and at least one or more antennas to transmit the at least one or more of the second data blocks.

In another aspect of the present invention, in a mobile communication system having a plurality of transmitting antennas, a signal processing method includes the steps of receiving a feedback signal including status information of at least one channel, segmenting one of the first data blocks to segment into at least one or more of the second data blocks, attaching a CRC to each of the at least one or more of the second data blocks, allocating the at least one or more of the second data blocks to a plurality of the transmitting antennas, respectively, and transmitting the at least one or more of the second data blocks.

Therefore, the present invention enables more efficient data transfer in such a mobile communication system using a plurality of transmitting/receiving antennas as a MIMO system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As one embodiment of a system to which the present invention is applied, it is assumed that an MIMO system includes M transmitting antennas and N receiving antennas (M≦N).

Figure 1:
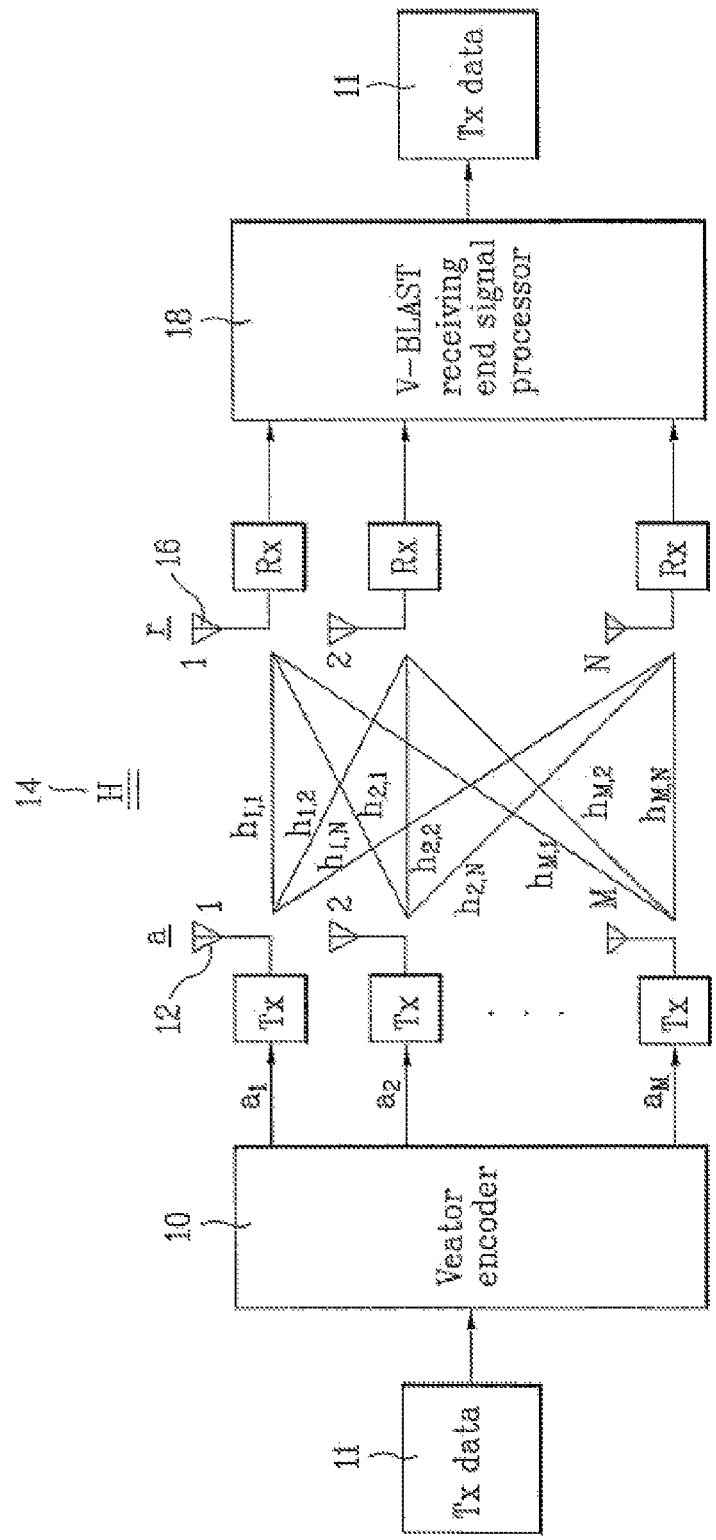
FIG. 1 is a block diagram of V-BLAST (vertical Bell laboratories layered space time) system as one of MIMO systems.
Figure 2:
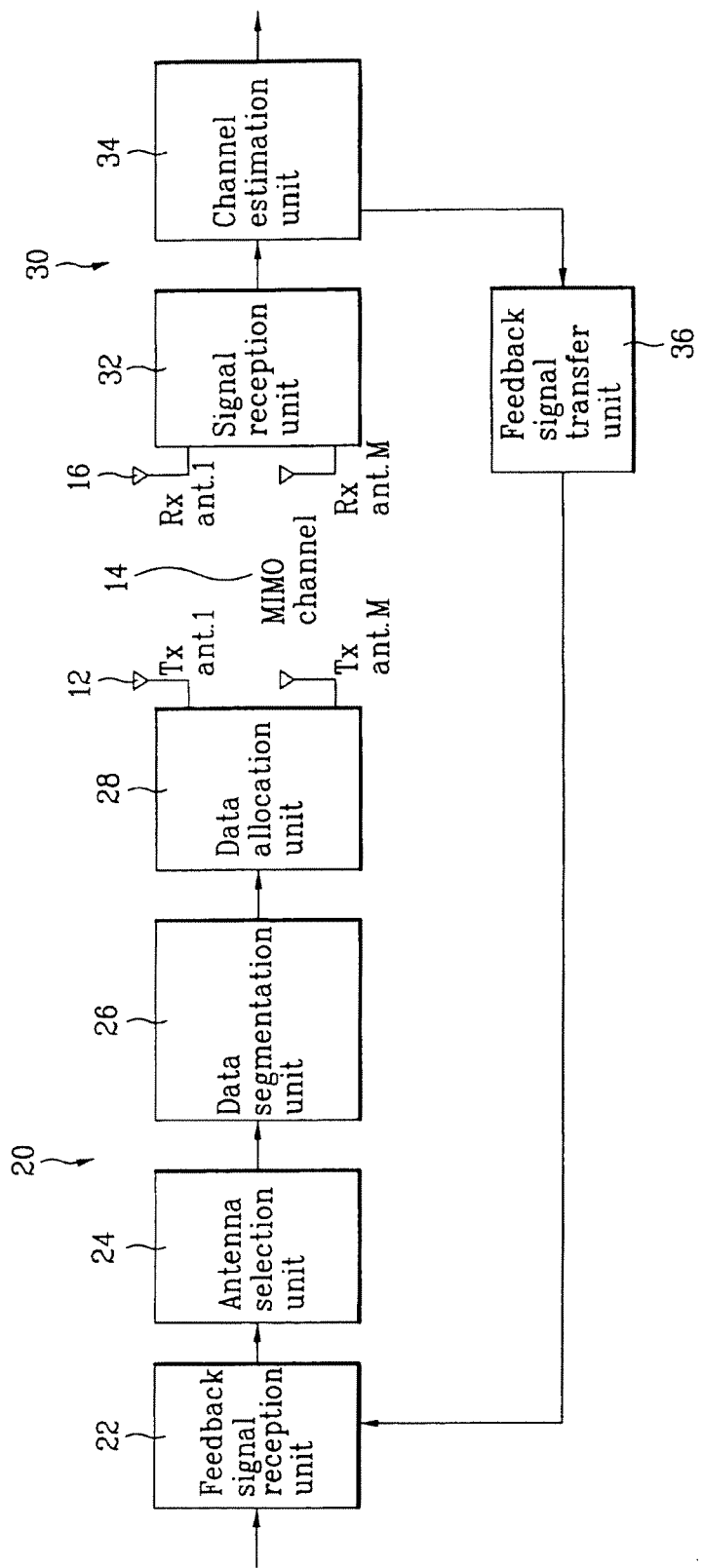
FIG. 2 is a block diagram of a MIMO system according to one embodiment of the present invention.

FIG. 2 is a block diagram of a MIMO system according to one embodiment of the present invention.

Referring to FIG. 2, in an MIMO system according to the present invention, a receiving end informs a transmitting end whether a signal transmitted from a specific transmitting antenna among a plurality of antennas used in the transmitting end is correctly detected by the receiving end. Therefore, the MIMO system according to the present invention enables efficient transmission/reception.

In the related art MIMO system, the respective channels 12 on which signals are transmitted/received are unable to maintain their independency. Namely, correlation between the respective antennas is generated to affect the independency of the respective channels. It is difficult for the receiving end 30 to detect the signal transmitted from the specific transmitting antenna. Hence, the signal transmitted from the specific transmitting antenna keeps causing an error to the receiving end.

To overcome such a problem, the presents invention provides an apparatus for estimating channel status to the transmitting and receiving ends and feeds back the estimated channel status to the transmitting end so that the transmitting end checks the channel status of each antenna. Therefore, the present invention enables to transmit a signal on a channel having a good status.

A transmitting end of a MIMO system according to the present invention includes an antenna selection unit 24, a data segmentation unit 26, and a data block allocation unit 28. The antenna selection unit 24 selects one of a plurality transmitting antennas to transmit a signal. Meanwhile, the data segmentation unit 26 segments data to be transmitted into a plurality of data blocks. And, the data block allocation unit 28 allocates the data blocks to M transmitting antennas, respectively.

Namely, the receiving end 30 receives the respective data transmitted via a plurality of the transmitting antennas 12 and checks whether the data are transmitted without errors. Hence, the receiving end 30 enables to check a channel status of a specific transmitting antenna. The receiving end 30 then feeds back the information of the channel status to the transmitting end so that the transmitting end 20 enables to transmit data on a channel having a good status.

The antenna selection unit 24 selects an antenna to which the data blocks will be allocated using the fed-back channel status information and then transfers the corresponding information to the data segmentation unit. The data segmentation unit 26 uses the information from the data antenna selection unit to segment the data to be transmitted into at least one or more data blocks.

The data block allocation unit 28 allocates the segmented data blocks to the corresponding antennas, respectively. The allocated data blocks are then transmitted via the corresponding antennas, respectively. Thus, the transmitting antenna having the good channel status is selected so that the data blocks are transmitted via the transmitting antenna corresponding to the channel 14 of which status is estimated as good.

In the transmitting end 30 including M transmitting antennas 12, the transmission data can be transmitted using all or a portion of the transmitting antennas. Namely, the transmitting antennas, which are estimated 'good', among the M transmitting antennas are entirely or partially selected. When the transmission data is segmented into data blocks, the data blocks are allocated to the transmitting antennas selected by the data block selection unit. Therefore, the data blocks are transmitted via the selected transmitting antennas.

Moreover, in constructing the data blocks by the data segmentation unit, a separate CRC (cyclic redundancy check) is attached to each data block. In this case, the CRC means a method of checking an error using a cyclic binary code to detect the error occurring in the data transmission in progress. The receiving end estimates a channel status corresponding to each transmitting antenna using the CRC.

Figure 3:
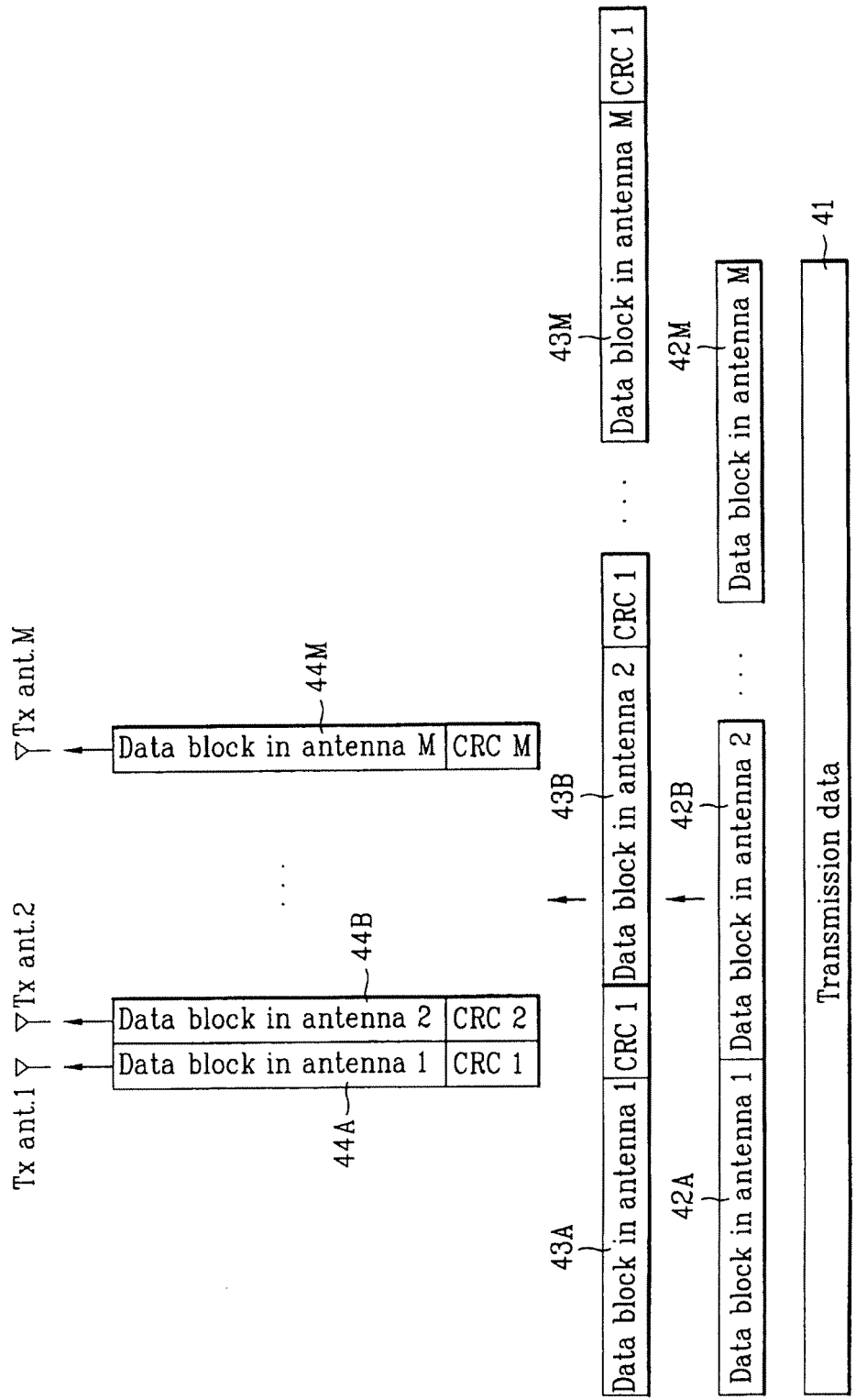
FIG. 3 is a diagram for explaining a method of constructing data blocks to be transmitted via transmitting antennas.

FIG. 3 is a diagram for explaining a method of segmenting data to be transmitted into at least one data block, in which a method of segmenting the data 41 to be transmitted is into data blocks by uniform size each.

Referring to FIG. 3, the data segmentation unit 26 segments the data 41 to be transmitted into M uniform-sized data blocks to transmit via a plurality of antennas.

Different CRCs are attached to the M segmented data blocks 42 to construct the respective data blocks 43. And, the data block allocation unit allocates the data blocks 43 to the antennas of which channel statuses are good.

Moreover, the data block 44 is not allocated to the transmitting antenna 12 when the feedback signal informing that errors consecutively occur is received from the receiving end 30 due to bad channel status of the corresponding transmitting antenna 12. And, a promised dummy signal and CRC are attached to the transmitting antenna, to which the data block is not allocated, to transmit.

Specifically, in case of receiving the feedback information that a signal of a specific transmitting antenna keeps causing errors from the receiving end 30, the signal transmitted via the specific transmitting antenna is just filled with dummy bits to transmit.

By the way, no signal may be transmitted via the antenna that keeps causing errors. Yet, the receiving end should be able to check whether the signal transmitted from the corresponding antenna keeps causing errors or not. Hence, the data to be transmitted is transferred via the transmitting antenna having good channel status and the dummy bits are transmitted via the corresponding antenna.

Assuming that the MIMO system uses four transmitting antennas, allocated signals are initially transmitted via the four transmitting antennas. The receiving end then checks CRCs of the signals transmitted via the respective transmitting antennas. If data transmitted via the first transmitting antenna causes an error, dummy bits are transmitted via the first transmitting antenna until the signal transmitted via the first transmitting antenna causes no error. In the mean time, the transmission data is transmitted via the second to fourth transmitting antennas.

A signal to which the promised CRC is attached is transmitted via the first transmitting antenna so that the receiving end enables to check whether the signal transmitted via the first transmitting antenna keeps causing errors or not. If the errors occur no more, the transmission data is transmitted via the first transmitting antenna.

In the MIMO system according to the present invention, the receiving end 30 includes a signal reception unit 32, a channel estimation unit 34, and a feedback signal transfer unit 36. The signal reception unit 32 receives signals via N receiving antennas. The channel estimation unit 34 monitors the signals received via the N receiving antennas to estimate channels statuses of the transmitting antennas, respectively. And, the feedback signal transfer unit 36 transmits the channel status information estimated by the channel estimation unit 34 to the transmitting end 20.

In doing so, the signal reception unit 32 detects the signals transmitted from the transmitting end for the signal processing by 'Zero-forcing' or 'MMSE (minimum-mean-square-error).

Moreover, the channel estimation unit 34 monitors the received signals or the attached CRCs to estimate the statuses of the receiving channels, respectively and checks the different CRC to discern the antenna having transmitted the corresponding signal.

Namely, the channel estimation unit 34 confirms that the received signal is received without an error using the CRC. Since the transmitting end segmented the data into a plurality of the data blocks and attached the different CRCs to the data blocks, respectively, the receiving end checks the respective CRCs to confirm that a plurality of the transmitted data blocks are received without errors.

Specifically, assuming that the transmitting end uses four transmitting antennas, the transmitting antennas are indicated by 00, 01, 10, and 11, respectively in turn to inform that the transmission signals of a certain transmitting antenna keep causing errors. In this case, whether the error of the signal transmitted from the corresponding transmitting antenna occurs or not can be known by checking the respective CRCs.

If signals transmitted from at least two transmitting antennas keep causing errors, indexes for the at least two antennas are simultaneously fed back to the transmitting end or are sequentially divided into feedback data to feed back.

Moreover, when all signals transmitted the entire transmitting antennas are normally received, portions in which the feedback bits are inserted can be left empty.

In case of a system requesting retransmission of the data causing error among the data from the respective transmitting antennas, ACK/NACK information can be generated from each antenna. In this case, NACK for the error-causing antenna is sent so that the signal transmitted from the corresponding antenna is retransmitted.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of transmitting data blocks at a transmitting end having M transmit antennas in a multiple input multiple output (MIMO) wireless communication system, M being greater than 1, the method comprising:
    selecting N transmit antennas from among the M transmit antennas, wherein N is less than M, wherein the selection is based on feedback information, wherein the selected N transmit antennas are used for transmitting the data blocks, and wherein the other (M−N) transmit antennas are not used for transmitting the data blocks;
    attaching cyclic redundancy check (CRC) to each of the data blocks;
    allocating each of the CRC-attached data blocks to each of the selected N transmit antennas; and
    transmitting, from the transmitting end to a receiving end, each of the CRC-attached data blocks via each of the selected N transmit antennas,
    wherein the CRC is independently attached to each of the data blocks,
    wherein the feedback information is based on channel status estimation of the M transmit antennas,
    wherein the feedback information includes indices on which the selection of the N transmit antennas is based,
    wherein the feedback information is received by the transmitting end from the receiving end,
    wherein at least one predetermined signal is transmitted via at least one of the M transmit antennas, and
    wherein, if information indicating that a specific predetermined signal, which is transmitted via a specific transmit antenna, is not correctly received by the receiving end is received by the transmitting end from the receiving end, the specific predetermined signal is retransmitted via the specific transmit antenna.

2. The method of claim 1, wherein:
    a number of the data blocks is equal to N.

3. The method of claim 1, wherein the at least one predetermined signal is used for the channel status estimation by the receiving end.

4. The method of claim 1, wherein the at least one predetermined signal is transmitted via each of the at least one of the M transmit antennas.

5. The method of claim 1, wherein the at least one of the M transmit antennas via which the at least one predetermined signal is transmitted is at least one of the other (M−N) transmit antennas.

6. The method of claim 1, wherein the at least one predetermined signal includes dummy bits predefined between the transmitting end and the receiving end.

7. A transmitting end for transmitting data blocks in a multiple input multiple output (MIMO) wireless communication system, the transmitting end comprising:
- M transmit antennas, wherein M is greater than 1;
- an antenna selection unit for selecting N transmit antennas from among the M transmit antennas, wherein the selection is based on feedback information, wherein the selected N transmit antennas are used for transmitting the data blocks, and wherein the other (M−N) transmit antennas are not used for transmitting the data blocks;
- a data segmentation unit for attaching cyclic redundancy check (CRC) to each of the data blocks;
- a data block allocation unit for allocating each of the CRC-attached data blocks to each of the selected N transmit antennas; and
- a transmitting unit for transmitting, from the transmitting end to a receiving end, each of the CRC-attached data blocks via each of the selected N transmit antennas,
- wherein the CRC is independently attached to each of the data blocks,
- wherein the feedback information is based on channel status estimation of the M transmit antennas,
- wherein the feedback information includes indexes on which the selection of the N transmit antennas is based,
- wherein the feedback information is received by the transmitting end from the receiving end,
- wherein at least one predetermined signal is transmitted via at least one of the M transmit antennas, and
- wherein, if information indicating that a specific predetermined signal, which is transmitted via a specific transmit antenna, is not correctly received by the receiving end is received by the transmitting end from the receiving end, the specific predetermined signal is retransmitted via the specific transmit antenna.

8. The transmitting end of claim 7, wherein:
a number of the data blocks is equal to N.

9. A method of receiving data blocks at a receiving end in a multiple input multiple output (MIMO) wireless communication system, the method comprising:
- receiving cyclic redundancy check (CRC)-attached data blocks, wherein a CRC is independently attached to each of the data blocks;
- estimating channel status of M transmit antennas of a transmitting end, wherein M is greater than 1; and
- transmitting, by the receiving end, feedback information based on the estimated channel status to facilitate selecting N transmit antennas from among the M transmit antennas for use in transmitting data blocks, such that the other (M−N) transmit antennas are not for use in transmitting data blocks,
- wherein the feedback information includes indexes to facilitate the selection of the N transmit antennas,
- wherein at least one predetermined signal is received via at least one of the M transmit antennas, and
- wherein, if information indicating that a specific predetermined signal, which is transmitted via a specific transmit antenna, is not correctly received by the receiving end is transmitted by the receiving end to the transmitting end, the specific predetermined signal is re-received via the specific transmit antenna.

10. The method of claim 9, wherein:
a number of the transmitted data blocks is to be equal to N.

11. The method of claim 9, wherein the at least one predetermined signal is used for the estimation of the channel status.

12. The method of claim 9, wherein the at least one predetermined signal is received via each of the at least one of the M transmit antennas.

13. The method of claim 9, wherein the at least one of the M transmit antennas via which the at least one predetermined signal is received is at least one of the other (M−N) transmit antennas.

14. The method of claim 9, wherein the at least one predetermined signal includes dummy bits predefined between the transmitting end and the receiving end.

15. A receiving end for receiving data blocks in a multiple input multiple output (MIMO) wireless communication system, the receiving end comprising:
- a signal reception unit for receiving cyclic redundancy check (CRC)-attached data blocks, wherein a CRC is independently attached to each of the data blocks;
- a channel estimation unit for estimating channel status of M transmit antennas of a transmitting end, wherein M is greater than 1; and
- a feedback signal transfer unit for transmitting feedback information based on the estimated channel status to facilitate selecting N transmit antennas from among the M transmit antennas for use in transmitting data blocks, such that the other (M−N) transmit antennas are not for use in transmitting data blocks,
- wherein the feedback information includes indexes to facilitate the selection of the N transmit antennas,
- wherein at least one predetermined signal is received via at least one of the M transmit antennas, and
- wherein, if information indicating that a specific predetermined signal, which is transmitted via a specific transmit antenna, is not correctly received by the receiving end is transmitted by the receiving end to the transmitting end, the specific predetermined signal is re-received via the specific transmit antenna.

16. The receiving end of claim 15, wherein:
a number of the transmitted data blocks is to be equal to N.

* * * * *